A. F. WHITIN.
Improvement in Boring-Tools.

No. 126,120.  Patented April 23, 1872.

Witnesses.
S. N. Piper
L. N. Möller

Arthur F. Whitin.
by his attorney
R. H. Eddy

UNITED STATES PATENT OFFICE.

ARTHUR F. WHITIN, OF WHITINSVILLE, MASSACHUSETTS.

IMPROVEMENT IN BORING-TOOLS.

Specification forming part of Letters Patent No. 126,120, dated April 23, 1872.

*To all persons to whom these presents may come:*

Be it known that I, ARTHUR F. WHITIN, of Whitinsville, of the county of Worcester, of the State of Massachusetts, have invented an Improved Reaming or Boring Tool or Mechanism; and do hereby declare the same to be fully described in the following specification, and represented in the accompanying drawing, of which—

Figure 1:
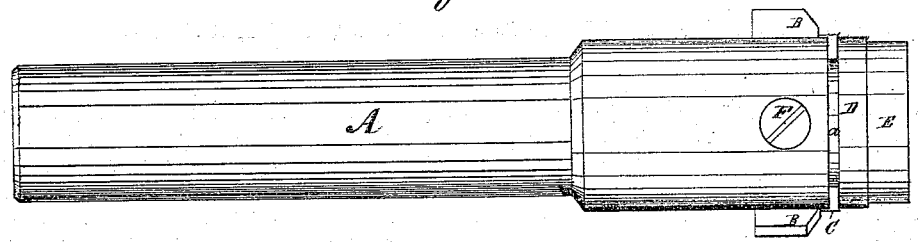
Figure 3:
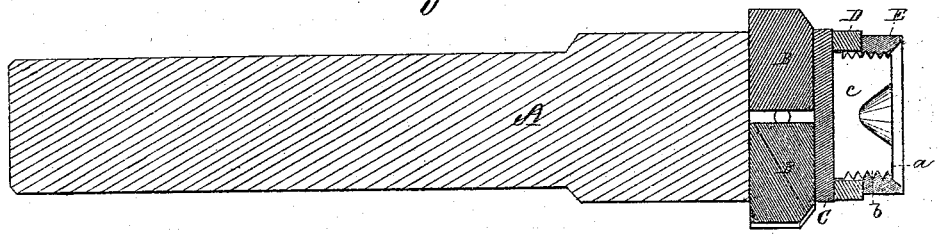
Figure 4:
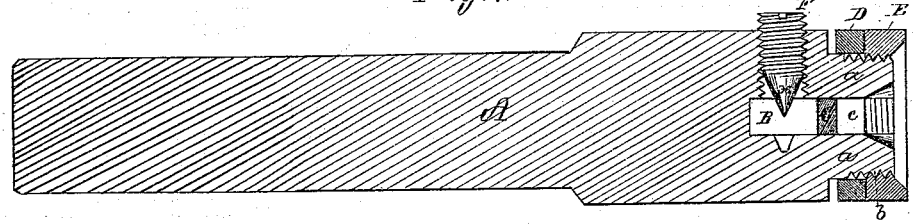
Figure 2:
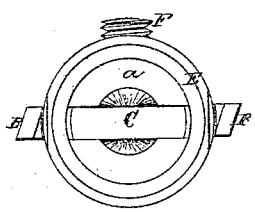

Figure 1 is a top view, Fig. 2 a front-end view, and Figs. 3 and 4 are longitudinal sections of it.

In such drawing, A denotes the shank or body of the article, it being formed with a cylindrical projection, $a$, having a male screw, $b$, cut or made upon its periphery. This projection and the body or shanks for some distance back of the projection have a transverse slot or chamber, $c$, made diametrically through them, such being to receive two cutters, B B, to extend into and from the body or shank A, in the manner as shown. On the two cutters and in the chamber there is laid a bar, C, which projects beyond the screw or part $a$ in opposite directions. There encompasses the screw and rests on the said bar a cylindrical ring, D, against which and on the screw $b$ is screwed a round nut, E. Furthermore, there is screwed into the side of the body or shank, and directly between the two cutters, or at right angles with their line of motion, a conical-pointed screw, F, the conical point $x$ being between and against the inner ends of the cutters. By screwing down the said screw both cutters may be simultaneously moved in directions away from each other, whereby their extent of projection from shank may be adjusted as may be desirable. The ring-nut, by being screwed down, sets the ring firmly against the diameter-bar and the latter against the cutters, so as to clamp them in place. The ring may be dispensed with, but when used it operates to prevent the diameter-bar from being moved by the nut so as to improperly move the cutters while the nut may be in the act of being screwed down.

I am aware that a reamer has been made with cutters arranged in a mortise going through the shank and open only at its ends, and having an adjusting-screw disposed in the end of the shank concentrically with its periphery, the cutters being provided with one or more clamp-screws or devices arranged below them. I make no claim to such. A reamer constructed in my improved manner, as described, has advantages—that is to say, it is easier by means of it to effect the adjustment and fixation of the cutters, and it can be made cheaper on account of the cutter-chamber being entirely open in front or toward the end of the shank.

I claim—

The improved reamer, as described, constructed with the endwise slot or cutter-chamber $c$ and the screw $b$, arranged in the shank, as set forth, and also with the nut E, (or the nut E and ring D,) the diameter-bar $c$, cutters B B, and the cone-pointed adjusting-screw, all being arranged and to operate substantially as explained.

ARTHUR F. WHITIN.

Witnesses:
R. H. EDDY,
J. R. SNOW.